US009061610B2

(12) United States Patent
Galbreath et al.

(10) Patent No.: US 9,061,610 B2
(45) Date of Patent: Jun. 23, 2015

(54) LAYERED SEATING WITH DIRECTED DEFLECTION FOR CHILD SEAT AND OCCUPANT SAFETY

(75) Inventors: Ashford A. Galbreath, Troy, MI (US); Terry R. O'Bannon, Royal Oak, MI (US); Asad S. Ali, Troy, MI (US); Scott Ziolek, Ann Arbor, MI (US)

(73) Assignee: Lear Corporation, Southfield, MI (US)

( * ) Notice: Subject to any disclaimer, the term of this patent is extended or adjusted under 35 U.S.C. 154(b) by 16 days.

(21) Appl. No.: 12/327,233

(22) Filed: Dec. 3, 2008

(65) Prior Publication Data

US 2009/0146472 A1    Jun. 11, 2009

Related U.S. Application Data

(60) Provisional application No. 61/005,650, filed on Dec. 6, 2007.

(51) Int. Cl.
*B60N 2/28* (2006.01)
*B60N 2/64* (2006.01)
*B60N 2/70* (2006.01)

(52) U.S. Cl.
CPC .............. *B60N 2/2887* (2013.01); *B60N 2/646* (2013.01); *B60N 2/7035* (2013.01)

(58) Field of Classification Search
CPC .......... A47C 7/18; A47C 7/20; B60N 2/2887; B60N 2/646; B60N 2/7035
USPC .............. 297/452.21, 452.23, 452.26, 452.27
See application file for complete search history.

(56) References Cited

U.S. PATENT DOCUMENTS

| 3,612,607 | A | * | 10/1971 | Lohr ....................... 297/452.27 |
| 4,254,991 | A |  | 3/1981 | Vanieris |
| 4,522,447 | A |  | 6/1985 | Snyder et al. |
| 4,699,427 | A | * | 10/1987 | Kobayashi ............... 297/452.62 |
| 4,795,215 | A | * | 1/1989 | Shimada .................. 297/452.62 |
| 4,837,881 | A | * | 6/1989 | Kondo et al. .................... 5/653 |
| 5,544,942 | A |  | 8/1996 | Vu Khac et al. |
| 5,556,169 | A |  | 9/1996 | Parrish et al. |
| 5,833,320 | A |  | 11/1998 | Kaneko et al. |
| 6,175,980 | B1 |  | 1/2001 | Gaither |
| 6,226,819 | B1 | * | 5/2001 | Ogawa et al. ..................... 5/653 |
| 6,378,948 | B1 |  | 4/2002 | Macher et al. |
| 6,478,376 | B2 | * | 11/2002 | Hayashi et al. ............ 297/250.1 |
| 6,571,411 | B1 | * | 6/2003 | Ebe ..................................... 5/653 |
| 6,634,710 | B1 | * | 10/2003 | Adamson et al. ............. 297/253 |

(Continued)

FOREIGN PATENT DOCUMENTS

DE    69405487 T2    4/1998
DE    19751091 A1    5/1999

(Continued)

OTHER PUBLICATIONS

German Office Action in Lear Case No. DE 10 2008 060 993.5 dated Aug. 4, 2010.

*Primary Examiner* — Philip Gabler
(74) *Attorney, Agent, or Firm* — MacMillan, Sobanski & Todd, LLC

(57) ABSTRACT

A seat cushion for a vehicle seat having attachment members for selectively attaching a child seat thereto includes a first layer having a first hardness and a second layer having a second hardness. The second layer is less hard than the first layer and defines a support surface upon which the child seat sets.

5 Claims, 4 Drawing Sheets

(56) References Cited

U.S. PATENT DOCUMENTS

| | | |
|---|---|---|
| 6,652,034 B1 | 11/2003 | Schramm et al. |
| 6,817,674 B2 | 11/2004 | Fujita et al. |
| 6,941,188 B1 * | 9/2005 | Arnold, II ............... 700/191 |
| 2004/0084937 A1 * | 5/2004 | Berta ............... 297/180.14 |
| 2005/0140199 A1 * | 6/2005 | Kang et al. ............... 297/452.27 |
| 2008/0015719 A1 | 1/2008 | Ziolek et al. |
| 2008/0015822 A1 | 1/2008 | Ziolek et al. |

FOREIGN PATENT DOCUMENTS

| | | |
|---|---|---|
| DE | 19845730 A1 | 7/1999 |
| DE | 202005004094 U1 | 6/2005 |
| DE | 102004062311 A1 | 8/2005 |
| DE | 102005042623 A1 | 3/2006 |

\* cited by examiner

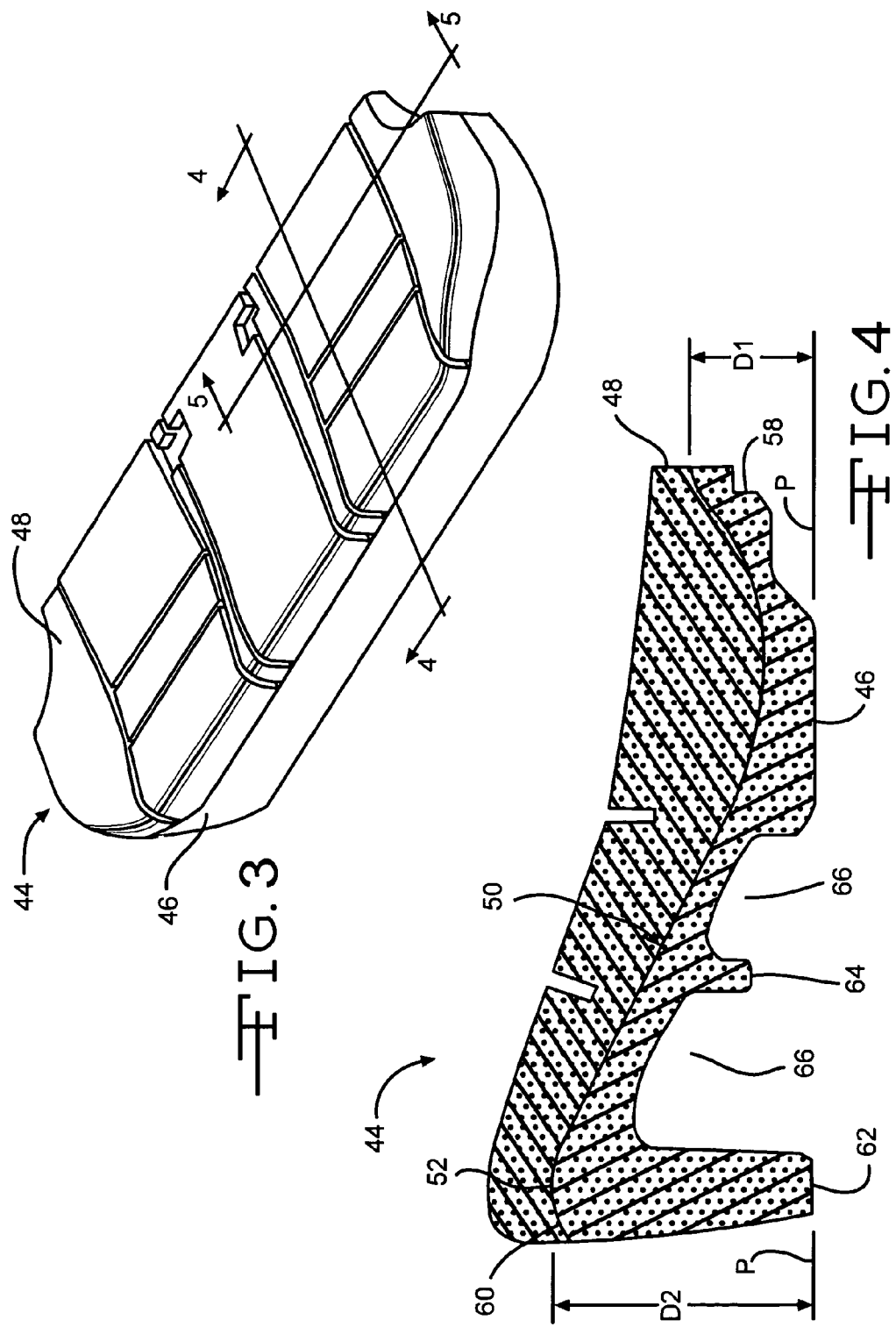

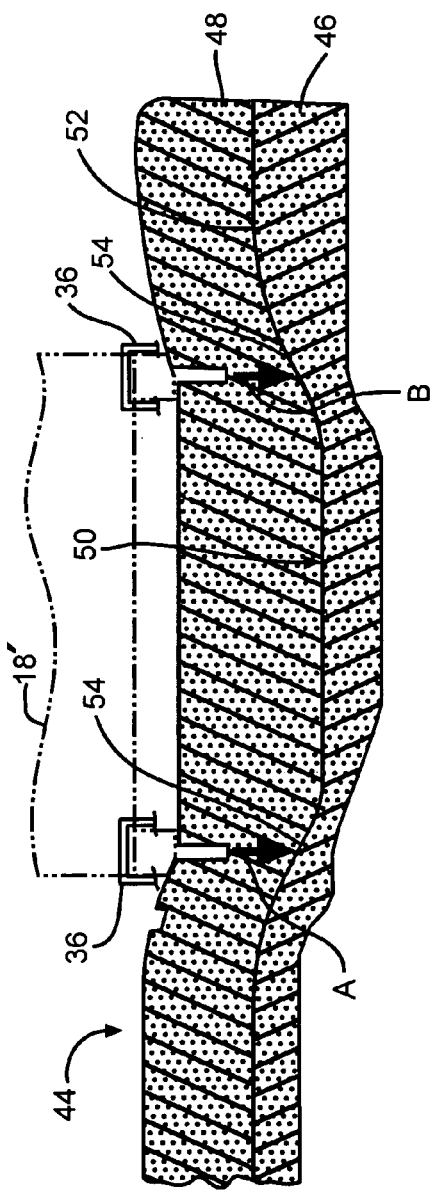
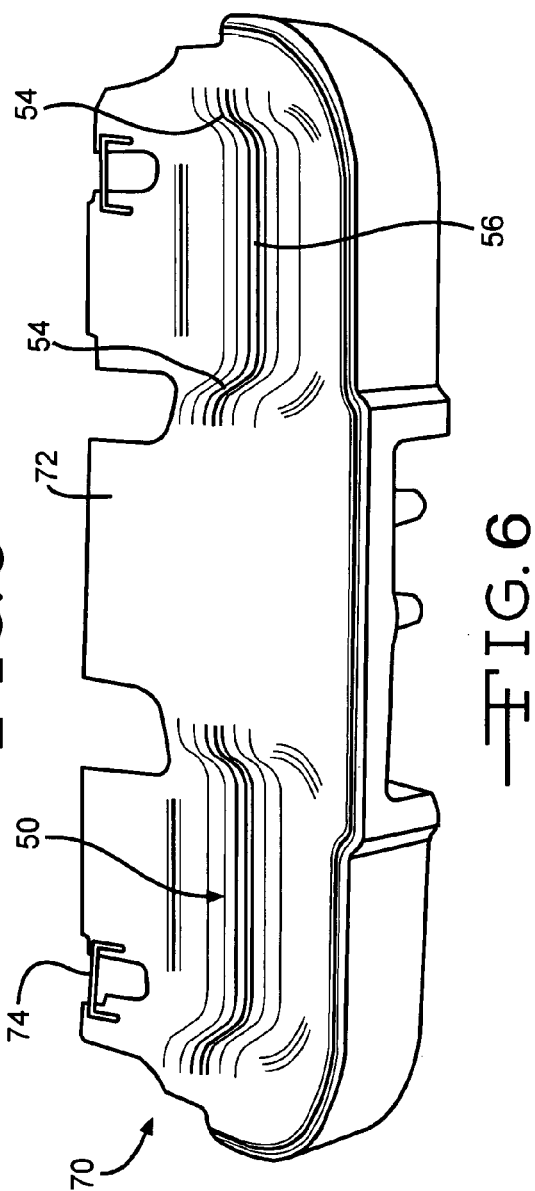

LAYERED SEATING WITH DIRECTED DEFLECTION FOR CHILD SEAT AND OCCUPANT SAFETY

CROSS REFERENCE TO RELATED APPLICATIONS

This application claims the benefit of U.S. Provisional Application No. 60/005,650 filed Dec. 6, 2007.

BACKGROUND

Various embodiments of a vehicle seat are described herein. In particular, the embodiments described herein relate to an improved seat for a vehicle.

Known vehicle seats are constructed in varying sizes and shapes, and from different materials in order to influence the comfort, performance, and other characteristics of the seat.

One example of a known seat is disclosed in U.S. Pat. No. 4,522,447 which discloses a seat cushion constructed of cellular elastic material. The cellular elastic material of the seat cushion is divided into segments having different modulli of elasticity.

Another example of the known seat is disclosed in U.S. Pat. No. 5,833,320 which discloses a motorcycle seat having a shock-absorbing member layered with a urethane cushion member.

SUMMARY

The present application describes various embodiments of a seat cushion for a vehicle seat. In one embodiment, a seat cushion for a vehicle seat having attachment members for selectively attaching a child seat thereto includes a first layer having a first hardness and a second layer having a second hardness. The second layer is less hard than the first layer and defines a support surface upon which the child seat sets.

Other advantages of the seat cushion for a vehicle seat will become apparent to those skilled in the art from the following detailed description, when read in light of the accompanying drawings.

BRIEF DESCRIPTION OF THE DRAWINGS

FIG. 3 is a perspective view of a second embodiment of the vehicle seat cushion illustrated in FIG. 2.

FIG. 4 is a cross sectional view of the second embodiment of the vehicle seat cushion taken along the line 4-4 of FIG. 3.

FIG. 5 is a cross sectional view of the second embodiment of the vehicle seat cushion taken along the line 5-5 of FIG. 3.

FIG. 6 is a perspective view of a portion of a third embodiment of the vehicle seat cushion illustrated in FIG. 2.

DETAILED DESCRIPTION

Figure 1:
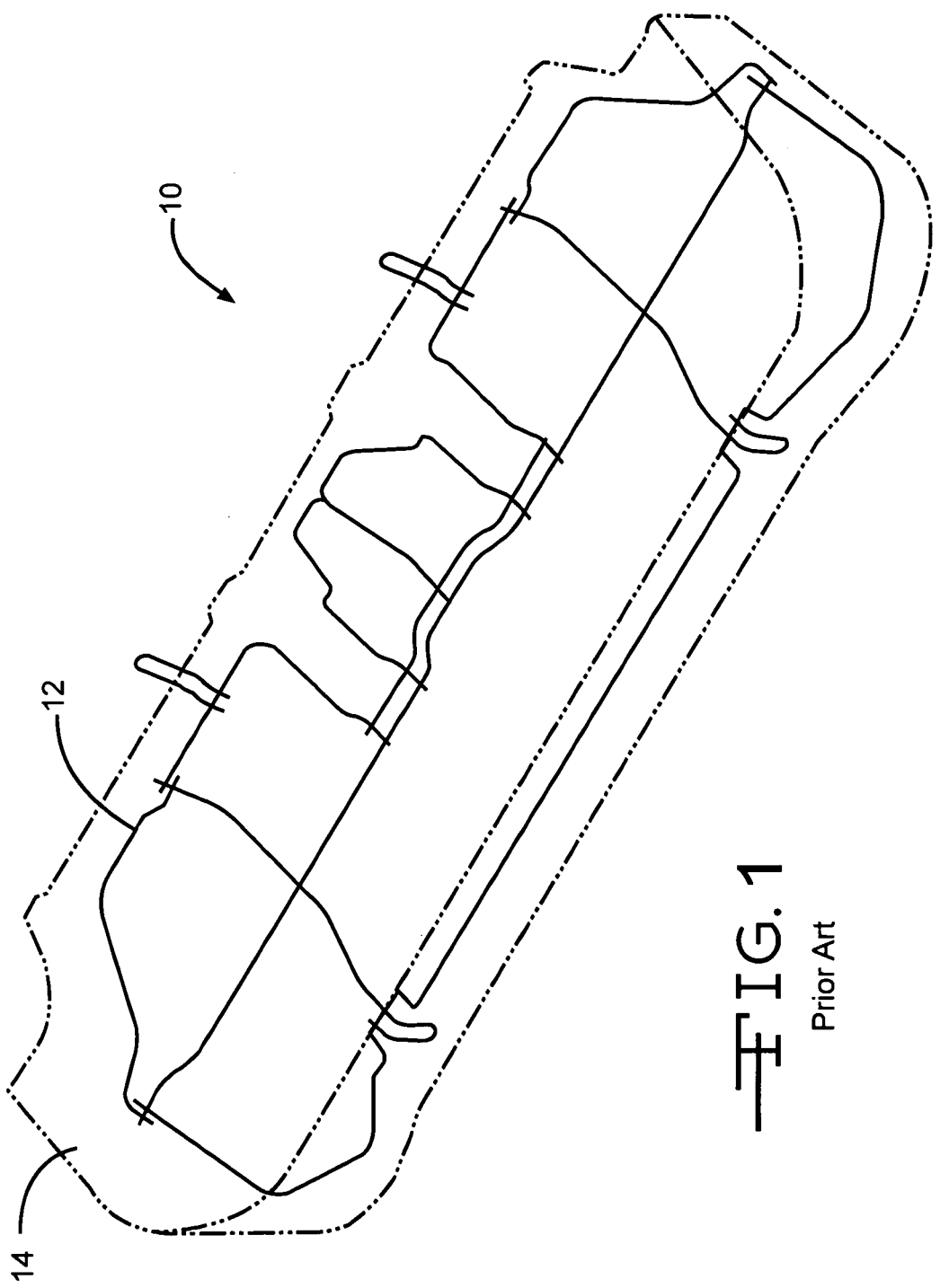
FIG. 1 is a perspective view of one embodiment of a known vehicle seat cushion.

Referring now to the drawings, there is illustrated in FIG. 1 a first embodiment of a known vehicle seat cushion, indicated generally at 10. The vehicle seat cushion 10 includes a wire support frame 12 embedded, such as by insert molding, in a bottom seat cushion 14. The wire support frame 12 provides rigidity and provides mounting and fastening features for mounting the seat cushion within a vehicle. The illustrated seat cushion 14 is formed from foam. The seat cushion 14 may be formed from a single layer of polymer foam having a consistent density and hardness. Any desired foam material, such as for example, polyurethane, may be used to form the seat cushion 14.

Figure 2:
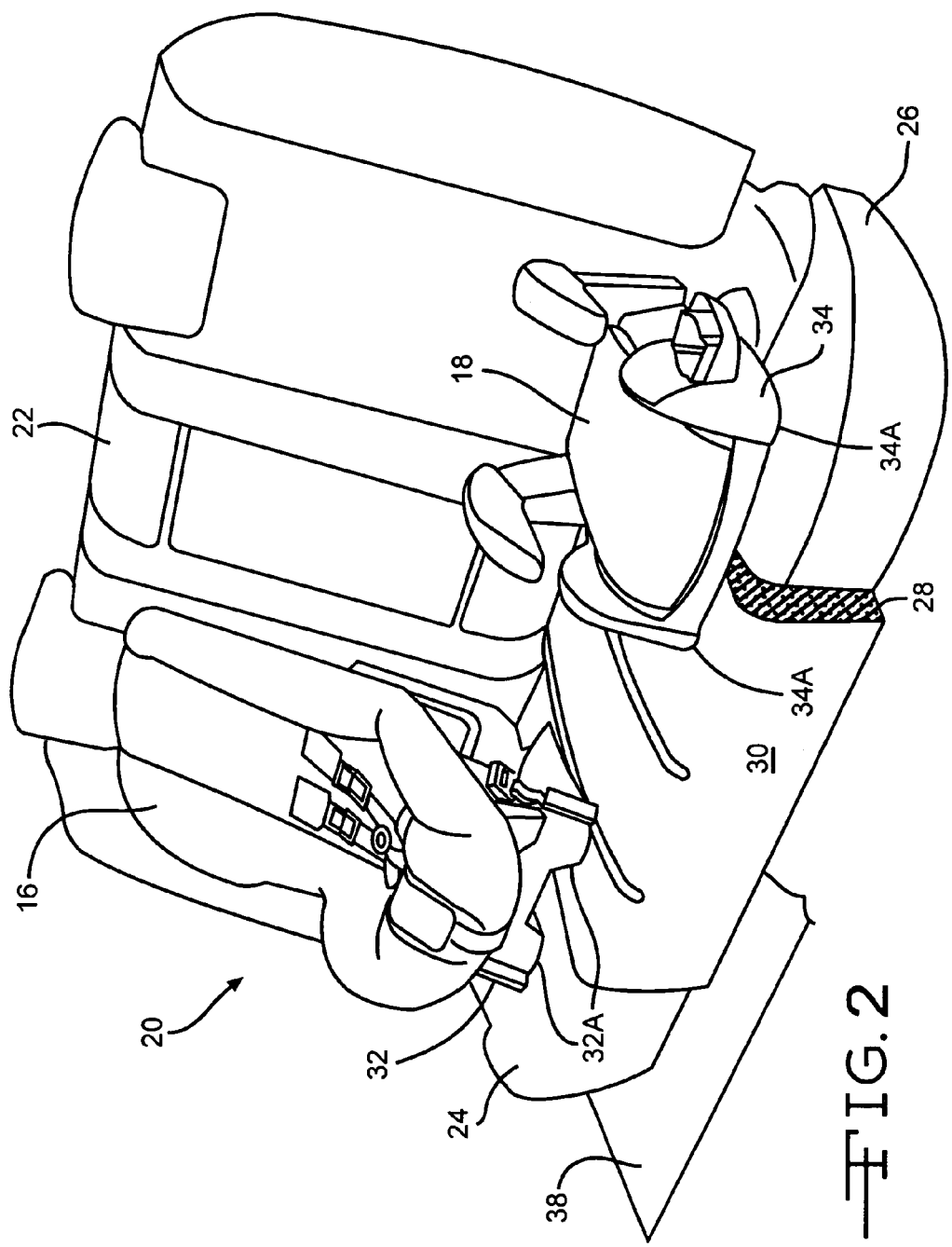
FIG. 2 is a perspective view, partially in section, of a first embodiment of a vehicle seat showing first and second embodiments of child seats mounted thereon.

Referring now to FIG. 2, there is illustrated a first embodiment of a vehicle seat indicated generally at 20. The illustrated vehicle seat 20 supports first and second embodiments of a child seat 16 and 18, respectively. The vehicle seat 20 includes a seat back 22 and a seat bottom 24. As best shown in FIG. 5, the vehicle seat 20 may include a plurality of attachment members 36 for attaching the child seats 16 and 18 to the vehicle seat 20. Such attachment members are attachment points for child safety seats in cars, commonly known as ISOFIX attachments.

The seat back 22 may be pivotally mounted to the seat bottom 24 via a recliner mechanism (not shown) for adjusting the seat back 22 to a desired inclined angle relative to the seat bottom 24. Such a recliner mechanism may be operated manually by a handle (not shown) or may include a motor drive unit (not shown) for electric operation. Although not illustrated, the seat back 22 may include a rigid seat frame.

The illustrated seat bottom 24 includes a first or stabilization layer 26. A second layer 28 is attached to an outer surface of the first layer 26 and defines a support surface upon which the child seat sets. The seat bottom 24 is covered with an outer trim cover layer 30. The outer trim cover layer 30 may be formed from any desired material, such as for example, cloth, leather, and vinyl. If desired, a relatively thin layer of foam material (not shown) may be attached between the second layer 28 and the outer trim cover layer 30.

The first layer 26 may be formed from any desired material that is harder or stiffer relative to the second layer 28. One example of a material suitable for the first layer 26 is expanded polypropylene (EPP). The second layer 28 may be formed from any desired material that is less hard or stiff relative to the first layer 26. Examples of materials suitable for the second layer 28 include polyurethane foam, other resilient foams, and woven or nonwoven material constructions comprising natural fibers, polypropylene, polyethylene, and/or polystyrene. The first layer 26 of the illustrated vehicle seat 20 is attached to a vehicle frame member, such as the vehicle floor pan 38, illustrated schematically in FIG. 2.

It will be understood that although the first layer 26 may be harder or stiffer relative to the second layer 28, the first and second layers 26 and 28, respectively, may be of equal density, or the first and second layers 26 and 28 may have different densities.

The first embodiment of the child seat 16 includes a base 32 having substantially parallel first and second base portions or rails 32A. The second embodiment of the child seat 18 is known as a booster seat and includes a base 34 having substantially parallel first and second base portions or rails 34A. Although not illustrated, each of the first and second embodiments of the child seat, 16 and 18 includes attachment latches for attaching the child seats 16 and 18 to the attachment members 36.

The embodiments of a vehicle seat, such as the seat 20, illustrated herein are bench seats. It will be understood however, that the structure, shape, and function of the stabilization layer may be applied to any seat configuration, such as for example, a 60-40 split, second or third row seat of a vehicle. The structure, shape, and function of the stabilization layer may also be applied to a single passenger seat, such as a captain's chair or a front passenger seat.

Referring now to FIG. 3, there is illustrated a second embodiment of a vehicle seat bottom indicated generally at 44. The illustrated seat bottom 44 includes a first or stabilization layer 46. A second layer 48 is attached to an outer surface of the first layer 46 and defines a support surface upon which a child seat, such as the seats 16 and 18 illustrated in FIG. 1, may set. The seat bottom 44 may be covered with an outer trim cover layer (not shown).

The first layer 46 provides desired support and deflection characteristics during normal vehicle operation and during and impact event. The first layer 46 may be formed from any desired material that is harder or stiffer relative to the second layer 48. One example of a material suitable for the first layer 46 is expanded polypropylene (EPP). The second layer 48 may be formed from any desired material that is less hard or stiff relative to the first layer 46. Examples of materials suitable for the second layer 48 include polyurethane foam, other resilient foams, and woven or nonwoven material constructions comprising natural fibers, polypropylene, polyethylene, and/or polystyrene. The first layer 46 of the illustrated seat bottom 44 is attached to a vehicle frame member, such as the vehicle floor pan (not shown).

As best shown in FIGS. 3 through 5, the first layer 46 includes a cavity or depression 50 formed in a surface 52 (upwardly facing when viewing FIGS. 3 through 5) thereof. The depression 50 has opposing curved side walls 54 extending outwardly (upwardly when viewing FIG. 5) from a bottom surface 56 of the depression 50.

As best shown in FIG. 4, to provide for the support and comfort of a vehicle occupant seated on the seat bottom 44, a rearward portion 58 of the first layer 46 is closer (as indicated by the line D1) to a substantially horizontal plane P than a distance D2 of a forward portion 60 of the first layer 46 (when viewing FIG. 4, the rearward portion 58 is lower relative to the forward portion 60) to the plane P. The contour of the surface 52 of the depression 50 may be determined by any desired means, such as by body pressure distribution analysis.

In the embodiment of the seat bottom illustrated in FIGS. 3 through 5, the side walls 54 are closer to the rails 34A of the child seat 18' than is the bottom surface 56 of the depression 50. The child seat 18' is thereby supported by the side walls 54 during an impact event. Additionally, forward and lateral excursion of a vehicle occupant (either seated upon the seat or within a child seat) is significantly reduced, thereby reducing the possibility of injury during an impact event.

The specific contour of the surface, such as the contour of the surface 52 of the depression 50, may balance comfort of a seated occupant during daily use, the occupant's hip-point or H-point location as referenced in known safety guidelines and regulations, with the improved support beneath a properly installed child seat 16, 18, 18'. It will be understood that contour shapes other than as illustrated herein may be used. For example, a stabilization layer may include outwardly extending (upwardly toward a child seat) portions to support and stabilize a child seat.

As best shown in FIG. 4, the first layer 46 may include strengthening ribs, such as the ribs 62 and 64, extending outwardly (downwardly when viewing FIG. 4) of a surface thereof. The ribs 62 and 64 define open spaces 66 therebetween. The combination of ribs 62 and 64 and open spaces reduces the amount of material required to form the first layer 46, provides a relatively lighter first layer 46 and further assists in absorbing forces from a seated passenger or an occupied child seat during an impact event.

Referring now to FIG. 5, the side walls 54 of the depression 50 are formed such that they are vertically aligned (positioned directly below the attachment members 36 when viewing FIG. 5) with the attachment members 36. For example, when a child seat, such as the booster seat (schematically illustrated at 18' in FIG. 5) is set on the seat bottom 44 and attached to the attachment members 36, the rails 34A of the base 34 are positioned opposite of (above the portion of the side walls 54 indicated by the arrows A and B when viewing FIG. 5), and aligned substantially longitudinally with, the side walls 54 of the depression 50.

The first layer 46 may have any suitable shape for controlling or eliminating asymmetric deflection of the first layer 46. Each of the first and second layers 46 and 48, respectively, may have any desired shape and thickness so as to provide desired support and comfort for a vehicle occupant seated thereon. For example, the relative thickness and the contour of the upper surfaces of the layer 46 and 48 may be designed and selected to achieve a desired level of comfort and to achieve desired passenger, or occupied child seat, support during normal use or during an impact event.

During an impact event, a conventional vehicle bottom seat cushion may deflect in an asymmetrical manner relative to the attachment members 36. Advantageously, the rails 34A of the base 34 of the child seat 18 are supported by the side walls 54 of the depression 50 during any of a side, frontal, and/or rear impact event. The position of the rails 34A relative to the side walls 54 further significantly minimize the asymmetric deflection of the child seat 18 during such impact events.

Referring now to FIG. 6, there is illustrated an alternative embodiment of a first or stabilization layer of a seat bottom indicated generally at 70. The illustrated first layer 70 is formed as one piece from a suitable material, such as EPP. A surface 72 (upwardly facing when viewing FIG. 6) includes the depression 50 formed therein. The depression 50 includes side walls 54 extending outwardly (upwardly when viewing FIG. 6) from the bottom surface 56 of the depression 50. The illustrated first layer 70 includes a wire frame component 74 attached thereto for attaching the first layer 70 to a portion of the vehicle, such as the vehicle floor pan (not shown).

The principle and mode of operation of the seat cushion for a vehicle seat have been described in its preferred embodiment. However, it should be noted that the seat cushion described herein may be practiced otherwise than as specifically illustrated and described without departing from its scope.

What is claimed is:

1. A seat cushion comprising:
 a first layer that is formed from a first material having a first hardness and having a length and a width, the first layer including an upwardly facing first surface and further having a depression therein that is defined by first and second curved side walls that extend from the first surface and are symmetrical in shape from a rearward portion to a forward portion of the first layer, the depression further having a bottom surface that is generally flat and extends completely between the first and second side walls, the depression having a length and a width smaller than the length and width of the first layer; and
 a second layer that is formed from a second material having a second hardness that is less hard than the first hardness, the second layer having a downwardly facing surface that engages the first surface of the first layer throughout the entire length and width of the first layer, including the first and second side walls and the bottom surface of the depression;
 wherein the second layer of the seat cushion is adapted to support a child seat thereon, and the first and second side walls of the depression are adapted to be aligned with first and second rails of the child seat.

2. The seat cushion defined in claim 1 wherein the first material is expanded polypropylene.

3. The seat cushion defined in claim 1 wherein the second material is a polyurethane foam.

4. The seat cushion defined in claim 1 wherein the second material is a woven or nonwoven material comprising a natural fiber, polypropylene, polyethylene, or polystyrene.

5. The seat cushion defined in claim 1 wherein the first material is expanded polypropylene, and wherein the second material is at least one material selected from the group consisting of a polyurethane foam, a woven natural fiber material, a nonwoven natural fiber material, a woven polypropylene material, a nonwoven polypropylene material, a woven polyethylene material, a nonwoven polyethylene material, a woven polystyrene material, and a nonwoven polystyrene material.

\* \* \* \* \*